US008042135B2

(12) United States Patent  (10) Patent No.: US 8,042,135 B2
Cho  (45) Date of Patent: Oct. 18, 2011

(54) METHOD OF CONTROLLING EPG RECEIVER AND EPG RECEIVER USING THE SAME

(75) Inventor: Eun Hyung Cho, Gumi-si (KR)

(73) Assignee: LG Electronics Inc., Seoul (KR)

( * ) Notice: Subject to any disclaimer, the term of this patent is extended or adjusted under 35 U.S.C. 154(b) by 423 days.

(21) Appl. No.: 11/702,571

(22) Filed: Feb. 6, 2007

(65) Prior Publication Data

US 2008/0010656 A1  Jan. 10, 2008

(30) Foreign Application Priority Data

Jul. 8, 2006  (KR) ......................... 10-2006-0064144

(51) Int. Cl.
G06F 3/00 (2006.01)
G06F 13/00 (2006.01)

(52) U.S. Cl. ................. 725/47; 725/44; 725/45; 725/39

(58) Field of Classification Search ................... 725/47, 725/37, 38, 39, 44, 45, 52, 58
See application file for complete search history.

(56) References Cited

U.S. PATENT DOCUMENTS 6,128,009 A  10/2000  Ohkura et al. ................ 345/327
(Continued)

FOREIGN PATENT DOCUMENTS
CN  1298602  6/2001
(Continued)

OTHER PUBLICATIONS

Korean Office Action Jun. 28, 2007.
(Continued)

*Primary Examiner* — William Trost, IV
*Assistant Examiner* — John Schnurr
(74) *Attorney, Agent, or Firm* — KED & Associates LLP

(57) ABSTRACT

A method of controlling an apparatus for receiving an electronic program guide (EPG), and an EPG receiver using the same, enable preferred broadcast programs to be displayed and viewed using a reserved recording function, without performing specific searching or playback operations, by employing a user channel to simulate reception of real-time television broadcasting to enable a sequential display and viewing of at least one broadcast program via the user channel. A process of user channel editing includes steps of storing in memory EPG information arranged according to broadcast channel and broadcast time, the EPG information indicating at least one broadcast program; displaying, based on the stored EPG information, an EPG menu including a broadcast program setting area for at least one user channel and the EPG information indicating at least one broadcast program; identifying a broadcast program of the displayed EPG information, according to a user selection, to register the identified broadcast program for preprogrammed playback; and storing in memory program registration information corresponding to the registered broadcast program. A process of simulating real-time television reception of preferred broadcast programs on a user channel includes steps of storing in memory EPG information arranged according to broadcast channel and broadcast time, the EPG information indicating at least one broadcast program; storing in memory information indicative of a user channel, the user channel information including program registration information, the program registration information identifying at least one broadcast program registered for preprogrammed playback and including a start time of the at least one registered broadcast program and a broadcast time of a corresponding broadcast program based on the EPG information; and enabling a display of the at least one registered broadcast program according to the start time of the at least one registered broadcast program.

37 Claims, 4 Drawing Sheets

U.S. PATENT DOCUMENTS

| | | | |
|---|---|---|---|
| 6,323,911 B1 * | 11/2001 | Schein et al. | 348/552 |
| 6,601,237 B1 * | 7/2003 | Ten Kate et al. | 725/47 |
| 2002/0078448 A1 * | 6/2002 | Wakahara | 725/39 |
| 2003/0188307 A1 * | 10/2003 | Mizuno | 725/28 |
| 2004/0117842 A1 * | 6/2004 | Karaoguz et al. | 725/105 |
| 2006/0206912 A1 * | 9/2006 | Klarfeld et al. | 725/40 |

FOREIGN PATENT DOCUMENTS

| | | |
|---|---|---|
| CN | 1339757 | 3/2002 |
| CN | 1347245 | 5/2002 |
| CN | 1582570 | 2/2005 |
| CN | 1747540 | 3/2006 |
| JP | 11-187324 | 7/1999 |
| JP | 11-187324 | 8/1999 |
| KR | 10-2003-0066744 | 8/2003 |
| KR | 10-2005-0049682 | 5/2005 |
| KR | 10-2007-0028768 | 3/2007 |
| WO | WO 96/09721 | 3/1996 |
| WO | WO 00/40012 | 7/2000 |
| WO | WO 00/40021 | 7/2000 |
| WO | WO 02/080552 | 10/2002 |

OTHER PUBLICATIONS

PCT International Search Report dated May 28, 2007.
Korean Notice of Allowance dated Mar. 6, 2008.
European Search Report dated Aug. 25, 2009.
Chinese Office Action dated Mar. 10, 2010.
Chinese Patent Gazette dated May 4, 2011 for Application No. 200780030057.4 (full Chinese text and English Abstract).

* cited by examiner

METHOD OF CONTROLLING EPG RECEIVER AND EPG RECEIVER USING THE SAME

This application claims the benefit of Korean Patent Application No. 10-2006-0064144, filed on Jul. 8, 2006, which is hereby incorporated by reference as if fully set forth herein.

BACKGROUND OF THE INVENTION

1. Field of the Invention

The present invention relates to a method of controlling an apparatus for receiving an electronic program guide (EPG) and to an EPG receiver using the same.

2. Discussion of the Related Art

A video device, e.g., a digital television receiver, may be provided with a large-capacity storage device such as a hard disc drive to perform a video recording operation. Such a video device may include a personal video recorder, digital video recorder, or the like—typically for recording a broadcast program currently being televised. On the other hand, such devices may be provided with a reserved (pre-programmed) recording function for recording programs scheduled to be broadcast at some known time in the future. For example, a user may program the video device to perform a recording operation in the future, whereby the recording operation is executed according to the programming, and the user can access and view the recorded broadcast programs after the recording operation is completed. An electronic program guide, or EPG, is used to reference scheduled start and end times of target broadcast programs.

To view broadcast programs recorded by the above reserved recording function of a contemporary video device, the user must search the storage device to access one or more desired programs to be reproduced for viewing, which is time-consuming and can be tedious. That is, a contemporary video device as above is essentially a static device, whereby program viewing can be achieved only by searching through a plurality of recordings (files) to select a specific file and then entering a playback mode for reproducing each searched file or a playback mode for reproducing a queue assembled by the user and made up of several individually searched programs. Therefore, a more dynamic method of viewing selected programs stored by a reserved recording function is needed.

SUMMARY OF THE INVENTION

Accordingly, the present invention is directed to an EPG receiver controlling method and EPG receiver using the same that substantially obviates one or more problems due to limitations and disadvantages of the related art.

An object of the present invention is to provide a method of controlling an EPG receiver and an EPG receiver using the same, by which preferred broadcast programs can be displayed and viewed using a reserved recording function, without performing specific searching or playback operations.

Another object of the present invention is to provide a method of controlling an EPG receiver and an EPG receiver using the same, which enhances user convenience by employing a user channel to enable a user to program the user channel with preferred broadcast programs recorded using a reserved recording function based on received EPG information.

Another object of the present invention is to provide a method of controlling an EPG receiver and an EPG receiver using the same, which can simulate reception of real-time television broadcasting by enabling a sequential display and viewing of at least one broadcast program via a user channel.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages in accordance with the purpose of the invention, as embodied and broadly described herein, there is provided a method of controlling an apparatus for receiving an electronic program guide, using a user channel editing process. The method comprises storing in memory EPG information arranged according to broadcast channel and broadcast time, the EPG information indicating at least one broadcast program; displaying, based on the stored EPG information, an EPG menu including a broadcast program setting area for at least one user channel and the EPG information indicating at least one broadcast program; identifying a broadcast program of the displayed EPG information, according to a user selection, to register the identified broadcast program for preprogrammed playback; and storing in memory program registration information corresponding to the registered broadcast program.

According to another aspect of the present invention, there is provided a method of controlling an apparatus for receiving an electronic program guide, using a process of simulating real-time television reception of preferred broadcast programs on a user channel. The method comprises storing in memory EPG information arranged according to broadcast channel and broadcast time, the EPG information indicating at least one broadcast program; storing in memory information indicative of a user channel, the user channel information including program registration information, the program registration information identifying at least one broadcast program registered for preprogrammed playback and including a start time of the at least one registered broadcast program and a broadcast time of a corresponding broadcast program based on the EPG information; and enabling a display of the at least one registered broadcast program according to the start time of the at least one registered broadcast program.

According to another aspect of the present invention, there is provided an EPG receiver controlling method comprising receiving a broadcast signal including EPG information indicating at least one broadcast program and a broadcast time of each broadcast program; storing in memory the received EPG information; generating, based on the stored EPG information, an EPG menu displaying the EPG information according to a channel of the received broadcast signal and displaying a broadcast program setting area according to at least one user channel; registering, with reference to the displayed EPG information, at least one broadcast program to a user channel of the EPG menu, the registering setting a specific time for reproducing each registered broadcast program; comparing, using the stored EPG information, the specific time with the broadcast time of each broadcast program; determining, based on the comparing, whether a broadcast program of the EPG menu is registerable for the specific time; recording, according to said determining, each registered broadcast program at the corresponding broadcast time; and reproducing each recorded broadcast program at the corresponding specific time. To ensure registerability of a broadcast program, the method may further comprise storing in the memory the received broadcast signal in correspondence to the stored EPG information, thereby recording the at least one broadcast program.

The EPG receiver controlling method of the present invention may further comprise receiving at least one additional broadcast signal including EPG information indicating at least one broadcast program of the at least one additional broadcast signal and a broadcast time of each broadcast program, wherein the EPG menu displays the stored EPG information according to each channel of the received broadcast signals and wherein, according to the registering, at least one broadcast program of a first channel and at least one broadcast program of a second channel are registered to one user channel.

According to another aspect of the present invention, there is provided an EPG receiver comprising a tuner for receiving EPG information indicating at least one broadcast program arranged according to broadcast channel and broadcast time; a display module for displaying, based on the stored EPG information, an EPG menu including a broadcast program setting area for at least one user channel and the EPG information indicating at least one broadcast program; a user interface for identifying a broadcast program of the displayed EPG information, according to a user selection, to register the identified broadcast program for preprogrammed playback; and a controller for storing in memory program registration information corresponding to the registered broadcast program and information indicative of a user channel, the user channel information including program registration information, the program registration information identifying at least one broadcast program registered for preprogrammed playback and including a start time of the at least one registered broadcast program and a broadcast time of a corresponding broadcast program based on the EPG information, and for enabling a display of the at least one registered broadcast program according to the start time of the at least one registered broadcast program.

According to the present invention, a user channel is established so that preferred broadcast programs (at least one) may be set within the user channel according to a desired viewing schedule, using time slots as the programming director of a broadcast channel might. Thus, a series of specific broadcast programs can be automatically "televised" according to a list of programs assembled using a reserved recording function. Hence, the manual procedures needed for the playback of recorded material can be eliminated.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE INVENTION

Reference will flow be made in detail to exemplary embodiments of the present invention, examples of which are illustrated in the accompanying drawings. Wherever possible, like reference designations will be used throughout the drawings to refer to the same or similar parts.

An apparatus for receiving an electronic program guide (EPG) according to the present invention, namely, an EPG receiver, enables the use of at least one "user channel," which is a special channel that may be programmed as desired by the user, i.e., dedicated to a specific user, who can therefore act as a sort of private programming director. That is, according to the method of the present invention, one or more broadcast programs may be set (programmed) in each user channel to be "televised," in a manner simulating a televised broadcast, according to a program sequence set for each user channel. The user channel—designated, for example, as User CH1, User CH2, User CH3, etc.—may be a specific channel carrying no broadcast signal, established according to an output mode that is set to enable an output (display) of previously stored A/V streams using a preset sequence programmed by the user.

Figure 1:
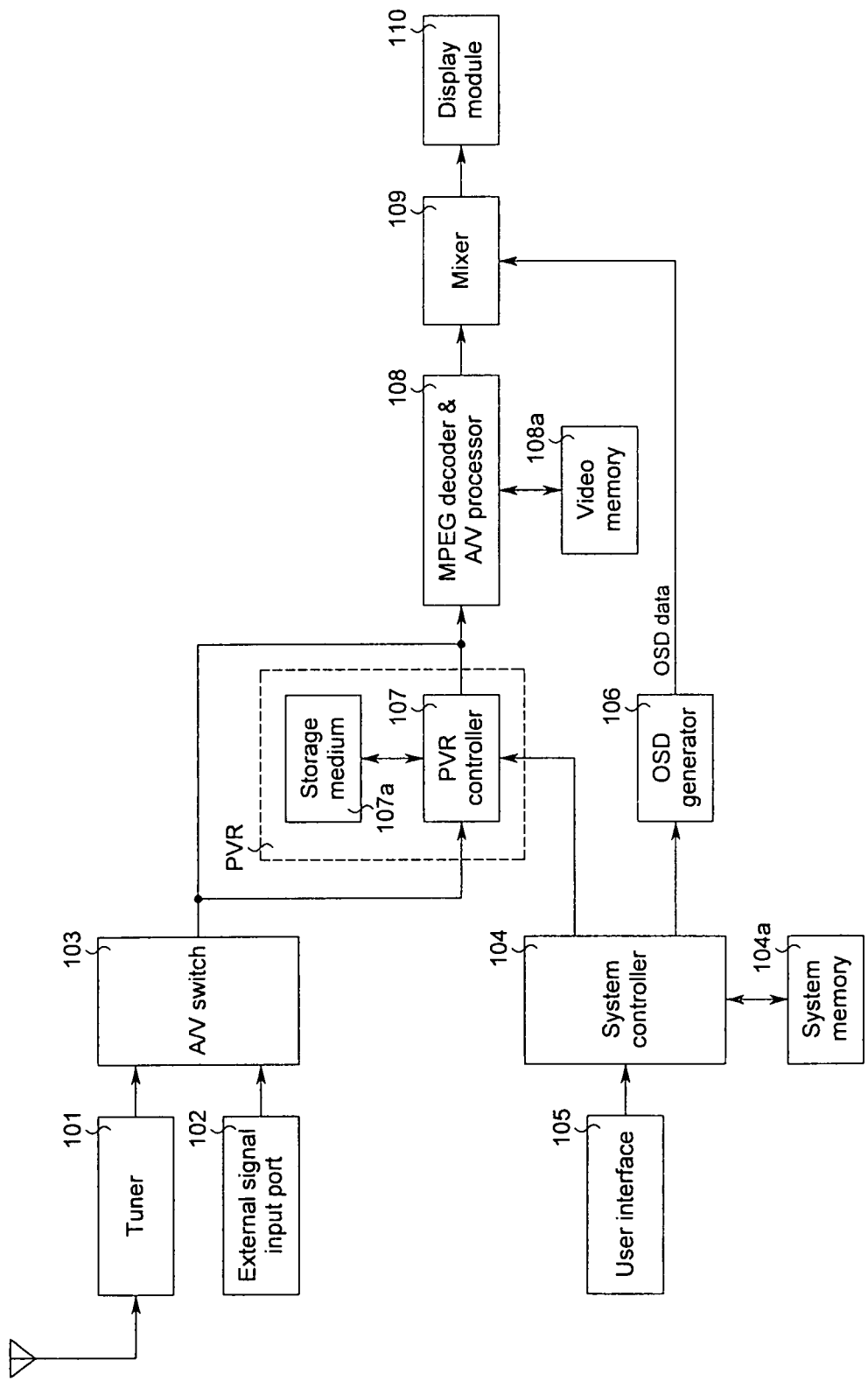
FIG. 1 is a block diagram of an EPG receiver according to the present invention.

Referring to FIG. 1, an EPG receiver according to the present invention includes a tuner 101, an external signal input port 102, an audio/video (A/V) switch 103, a system controller 104 with a system memory 104a, a user interface 105, an on-screen display (OSD) generator 106, a personal video recorder (PVR) controller 107 with a storage medium 107a (e.g., a hard disc drive), an MPEG decoder and A/V signal processor 108 with a video memory 108a, a mixer 109, and a display module 110. The above EPG receiver may be a digital television receiver, a cellular phone, a personal computer, or other apparatus capable of receiving an electronic program guide (i.e., EPG information), such as that included in a digital television broadcast signal, and is provided with a personal video recorder, a digital video recorder, or the like.

The user interface 105, which may comprise one or both of a remote controller and local keypad, outputs to the system controller 104 various commands and information received from a user, i.e., according to a user selection, including in particular a registration command to identify and thus select from the display of an electronic program guide at least one broadcast program and to assign the selected program to a specific time slot of a designated user channel. In response to the user commands and in accordance with a system program stored in the system memory 104a, the system controller 104 controls the overall system of the EPG receiver of the present invention, including in particular the tuner 101, the A/V switch 103, and the MPEG decoder and A/V processor 108. The system controller 104 controls the tuner 101, which comprises multiple tuning elements enabling broadcast streams to be simultaneously received via at least two individually processed channels, to receive (tune) the broadcast signal of at least one channel and to thereby output the received broadcast signal to the A/V switch 103. That is, the tuner 101 simultaneously receives EPG information for each channel, and the EPG information contains broadcast program information per channel per broadcast time. The EPG information includes information indicating start and end times of a corresponding broadcast program and may be arranged according to channel across a predetermined time period (e.g., hours of broadcast time or "time slots") as in the example of FIG. 2, which shows the start and end times of programs broadcast by three broadcast channels (Broadcast CH1, Broadcast CH2, and Broadcast CH3) and recorded programs carried by two user channels (User CH1 and User CH2), each arranged over a corresponding period of programming time.

Using the received EPG information, the system controller 104 determines a broadcast program setting area (time slots) of the displayed user channel and enables a sequential display (simulated television reception in real-time) of the broadcast programs recorded by the reserved recording function. In doing so, a broadcast program setting area of each user channel is displayed using the EPG information of the selected programs. The pre-programmed display enables viewing according to the sequence set within the displayed broadcast program setting area.

The tuner 101, which comprises demodulation circuits (not shown), reconstructs a transport stream received via the tuned channel or channels into an audio stream, a video stream, and a data stream and outputs the reconstructed streams to the A/V switch 103. Among these, the data stream contains the EPG information. Meanwhile, the external signal input port 102 applies an external signal, received from an auxiliary input device such as a DVD player or a set-top box, to the A/V switch 103, which selectively outputs at least one of its input signals under control of the system controller 104. The selected output of the A/V switch 103 is applied to the PVR controller 107 and to the MPEG decoder and A/V processor 108, which performs decoding and signal processing using the video memory 108a and outputs audio data and video data separately. It should be appreciated that the A/V processor of the MPEG decoder and A/V signal processor 108 outputs an audio signal as well as a video signal and that the audio signal output is applied to a speaker (not shown). The video data output undergoes a mixing operation performed by the mixer 109, to introduce OSD data generated by the OSD generator 106 under control of the system controller 104, so that a video signal including the OSD data is output to the display module 110. In doing so, the OSD generator 106 generates OSD data for the received EPG information and for a selected user channel, and the display module 110 displays the corresponding information, including the original EPG information and the OSD information for at least one user channel and its broadcast program setting area arranged with the programs to be "televised" according to the sequence set by the user.

Under the control of the system controller 104, the PVR controller 107 enables at least one A/V stream output from the A/V switch 103 to be stored in the storage medium 107a and reads out the stored stream to the MPEG decoder and A/V processor 108. To enable a sequential display of the set broadcast programs of the user channel, i.e., viewing of a designated user channel according to the simulated television reception function of the present invention, the PVR records and sequentially reproduces (reads) the set broadcast programs under the control of the system controller 104. Thus, the broadcast program stored in the storage medium 107a may be played back, using an enabled viewing function, in correspondence with the read video and audio streams being read out from the storage medium 107a for output via the MPEG decoder and A/V processor 108. Here, the enabled viewing function may correspond to the display module 110 being powered on or to the corresponding user channel being selected.

Figure 2:
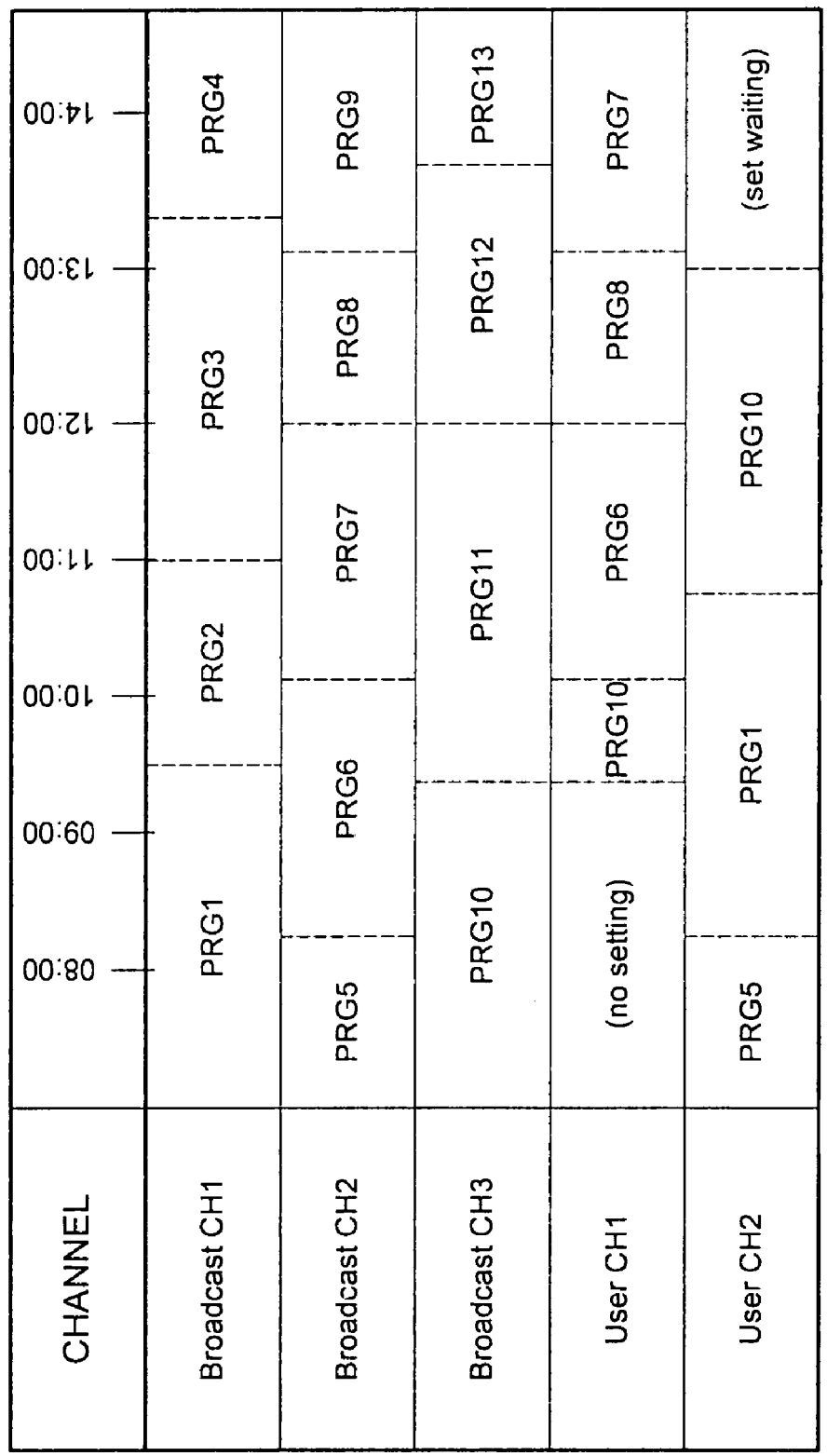
FIG. 2 is a diagram of an exemplary screen for programming a user channel according to the present invention.

Referring to the exemplary view of FIG. 2, an EPG menu of the present invention includes additionally displayed EPG information, namely, that for at least one user channel, such as "User CH1" or "User CH2," which is displayed in addition to EPG information received via the tuner 101. Here, a serial display of a corresponding broadcast program setting area, including a plurality of time slots, is shown for each of user channels CH1 and CH2, appearing immediately adjacent their respective channel indications. Individually delineated areas of the broadcast program setting area of a user channel indicate a broadcast program set for the user channel and includes such EPG information as the program's title and its corresponding time slot (start and end times). The EPG menu may comprise any information made available by the received EPG information.

With the display module 110 displaying such an EPG menu as in FIG. 2, a user may select a user channel registration for one or more of the broadcast programs with reference to the EPG menu and set the selected program(s) according to a time slot. In thus setting the respective programs of a user channel, i.e., programming a user channel, the user may set the corresponding broadcast program to have a "broadcast" time designated by the received EPG information, to correspond to its actual broadcast time, or may set a different time. If a different time is set, the set time must be later than (not earlier than) the time designated by the EPG information. In other words, naturally, it is impossible to record or view a program before its original air time.

Accordingly, by referring to the EPG menu displayed by the display module 110, a user manipulates the user interface 105 to program a designated user channel using only broadcast programs preferred by the user. For instance, as shown in FIG. 2, a user may edit the user channel CH2 for a later viewing, through a simulated television reception function, of the preset sequence of program PRG5 (broadcast originally on Broadcast CH2), program PRG1 (broadcast originally on Broadcast CH1), and program PRG10 (broadcast originally on Broadcast CH3). Thereafter, the PVR controller 107 controls the MPEG decoder and A/V processor 108 to store in the storage medium 107a the respectively set broadcast programs, namely, programs PRG5, PRG1, and PRG10, and the system controller 104 controls the PVR to output these three programs according to their preset sequence and their preset times.

One or more time slots of a user channel may be left with no broadcast program being registered for reserved playback, whereby at the time of reserved playback, the user channel will carry no program, as indicated by the "no setting" reference for the time slots before 09:30 of the user channel CH1. Similarly, after the passage of some time after a programming of a user channel, one or more of the newly displayed (more current) time slots of a user channel may also have no broadcast program yet registered for reserved playback, whereby at the time of reserved playback, the user channel will carry no further programming, as indicated by the "set waiting" reference for the time slots after 13:00 of the user channel CH2.

User channel information of an EPG menu may be periodically displayed by the system controller 104 together with currently received EPG information, enabling a user (the current viewer) to select and set broadcast program play times. A further selection made by the user may determine whether a broadcast program of the user channel is to be permanently stored or is to be deleted at some point, for example, after its scheduled time of playback or after one or more viewings.

According to the present invention, each user channel may be safeguarded by a password, which may be used to block other channels, including all broadcast channels and all other user channels, so that only the specified user channel is enabled for display by the EPG receiver according to the present invention. Here, a correct password entry could enable a specific user channel, by employing an on-screen display prompt such as "lock viewing to User CH1?" and querying the user for a "Yes/No" type of confirmation. Similarly, a correct password entry could disable a specific user channel, by employing another on-screen display prompt such as "lock out viewing of User CH1?" and querying the user for a "Yes/No" type of confirmation. Thus, the present invention further includes steps of selectively blocking one or more channels and storing a password assigned by the user to release the blocked channels.

According to the present invention, the system controller 104 executes a processes for user channel editing for simulating real-time television reception of preferred broadcast programs on a user channel. The user channel editing process essentially includes steps of storing in memory EPG information arranged according to broadcast channel and broadcast time, the EPG information indicating at least one broadcast program; displaying, based on the stored EPG information, an EPG menu including a broadcast program setting area for at least one user channel and the EPG information indicating at least one broadcast program; identifying a broadcast program of the displayed EPG information, according to a user selection, to register the identified broadcast program for preprogrammed playback; and storing in memory program registration information corresponding to the registered broadcast program. Meanwhile, the simulated television reception process essentially includes steps of storing in memory EPG information arranged according to broadcast channel and broadcast time, the EPG information indicating at least one broadcast program; storing in memory information indicative of a user channel, the user channel information including program registration information, the program registration information identifying at least one broadcast program registered for preprogrammed playback and including a start time of the at least one registered broadcast program and a broadcast time of a corresponding broadcast program based on the EPG information; and enabling a display of the at least one registered broadcast program according to the start time of the at least one registered broadcast program.

Figure 3:
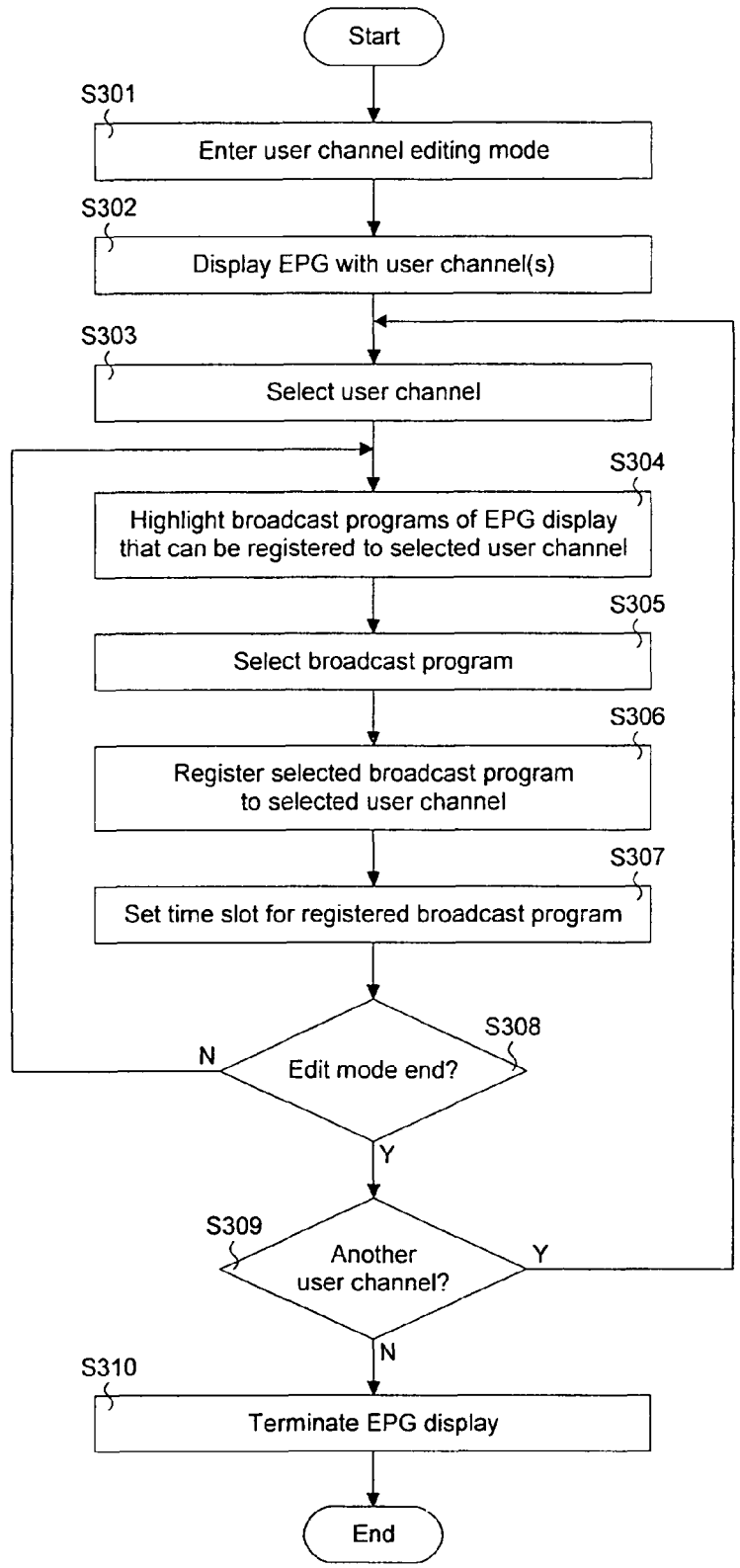
FIG. 3 is flowchart of a process for registering broadcast programs to a user channel according to the method of the present invention.

Referring to FIG. 3, illustrating a broadcast program registration process according to the method of the present invention, first, a command signal for entering a user channel editing mode is applied to the system controller 104 via the user interface 105 (S301). In doing so, the OSD generator 106 generates OSD data for constructing an EPG menu, using received EPG information and including information for displaying a broadcast program setting area for at least one user channel (S302). If multiple user channels exist, a specific user channel is selected (S303). To facilitate editing by the user, the system controller 104 may highlight broadcast programs having a broadcast time, relative the current time, that enables its registration to the selected user channel, namely, its designation for reserved recording and pre-programmed playback (S304). By referencing the EPG menu, the user selects the broadcast program(s) to be set for the user channel being programmed and registers the selected program by storing corresponding program registration information in the video memory 104a (S305, S306). In doing so, a time slot for the thus-registered broadcast program is also set (S307). The steps S304-S307 may be repeated, as necessary, to achieve a desired setting or modification of any number of programs during a given editing session (S308). A similar editing operation may be executed for another user channel (S309). When the user channel editing mode is to be exited, display of the EPG menu is terminated (S310).

Accordingly, the process of FIG. 3 enables editing of the set at least one broadcast program for any number of designated user channels. That is, the broadcast programs may be set for a user channel in random order and for any number of editing sessions as desired, including resetting and deleting any setting, the reassignment of the corresponding time slot to change the start time for preprogrammed playback, and the assignment of multiple time slots for a given program to simulate its repeat broadcasting. Meanwhile, the highlighting of the step S304 may be achieved using any available display characteristic of the EPG menu, e.g., varying or momentarily alternating colors, brightness, or line widths of the respective (delineated) areas of the broadcast programs setting area, to provide a visual contrast enabling discrimination between registerable and non-registerable programs. In addition, the setting of a broadcast program for reserved recording and pre-programmed playback, as in the steps S305~S307, is achieved by manipulating the user interface 105, for example, by dragging a cursor from a specific broadcast program area of a broadcast channel to a desired time slot of the broadcast program setting area of a user channel and then dropping the cursor. That is, the step S305 may be achieved according to an initial point (e.g., a first mouse click) of cursor dragging, with one or both of the steps S306 and S307 being achieved according to an end point (drop) of cursor dragging, such that a reserved "televising" time (programming time slot) is automatically set by the system controller 104 in correspondence to the drop position within the user channel's broadcast program setting area. Accordingly, the program registration information determined in the steps S304~S307 includes information identifying the corresponding broadcast program and a start time for the preprogrammed playback of the identified broadcast program, to set the information identifying the corresponding broadcast program in the broadcast program setting area of the displayed EPG menu.

On the other hand, exact data may be entered using specific keys, e.g., function keys, arrow keys, and a set of alphanumeric keys, to achieve one or more of the steps S305~S307. The entry of exact data may enable a setting of limited portions of an entire broadcast portions, as in the case of a shortened program PRG10 of the user channel User CH1 in FIG. 2, which contrasts with its longer original of the broadcast channel Broadcast CH3 or the user channel User CH2. Also, select portions of set broadcast programs may displayed on an auxiliary screen according to a picture-in-picture function of the EPG receiver during the playback and viewing of another broadcast program on a main screen.

In the present invention, broadcast programs of an electronic program guide are taken as examples of the broadcast programs of a user channel. Yet a user channel may be programmed using any A/V signal that can be pre-recorded in the PVR of the EPG receiver of the present invention. For example, by selecting an input signal from the external signal input port 102 for output from the A/V switch 103, the PVR controller 107 may incorporate the corresponding input signal into the programming of a selected user channel, such that a broadcast program registered to a user channel may include an A/V signal supplied from an auxiliary input device, and such an A/V signal may include its own EPG information or may be recorded in the PVR without EPG information. Therefore, user channel editing operations are unrelated to any specific tuning by the EPG receiver, to the available channels of broadcast reception, or to their broadcasting schedule (i.e., the sequence of broadcast program transmission) as indicated by the EPG information of a received data stream.

Figure 4:
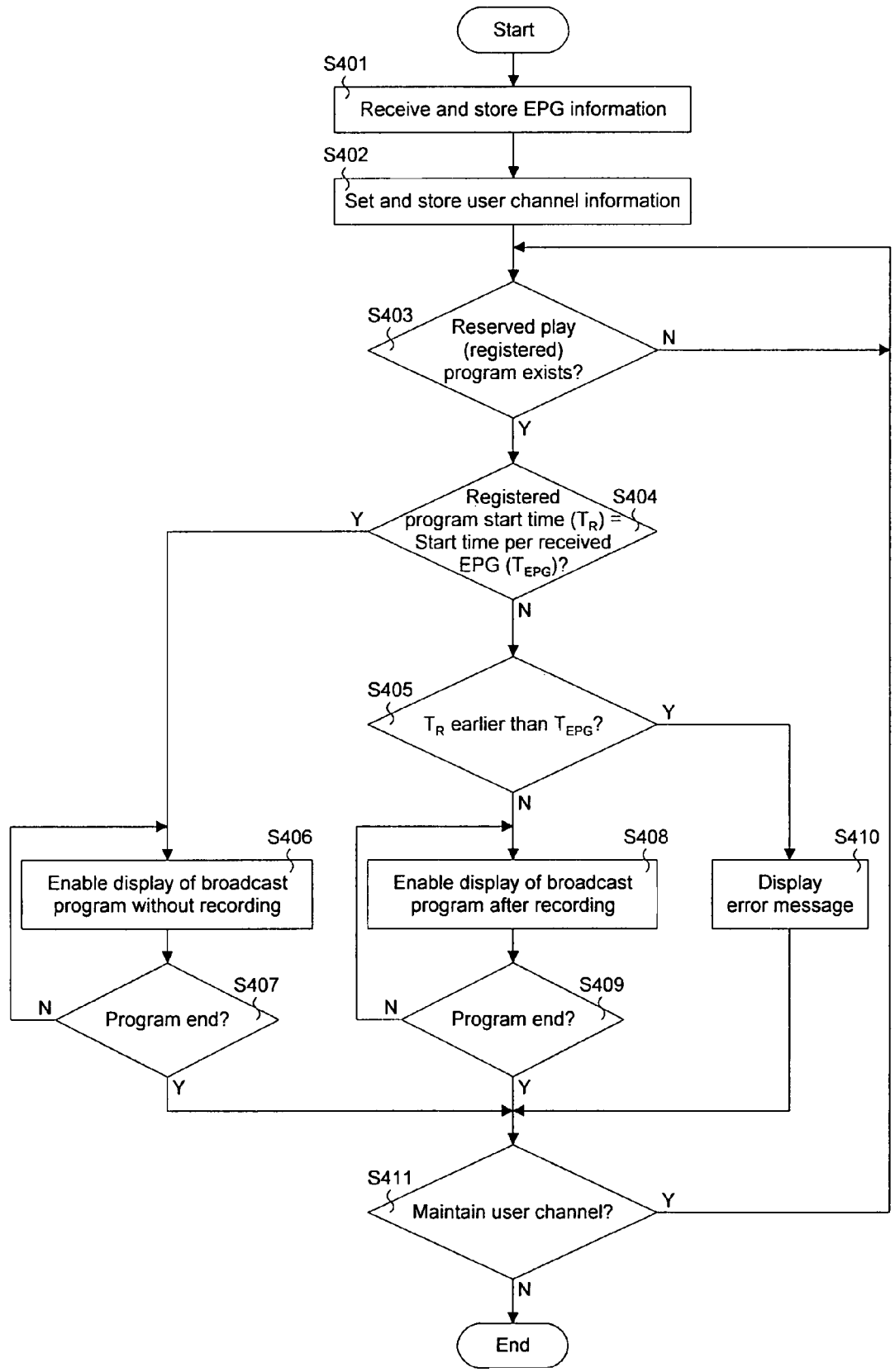
FIG. 4 is a flowchart of a process for simulating a real-time television reception of preferred broadcast programs on a user channel according to the method of the present invention.

Referring to FIG. 4, illustrating a simulated television reception process of broadcast programs set in a user channel according to the process of FIG. 3, first, EPG information is received and the received information is stored in the system memory 104a (S401). If EPG information is received and stored as above, a user channel may be set by the user (designated), including the settings performed by the process of FIG. 3, and the corresponding user channel information is stored in the system memory 104a (S402). Here, a password entry may be required to block or release one or more channels in correspondence with the user channel designation. In other words, a user channel may be designated by storing in memory a password assigned by a user; comparing an entered password with the stored password to determine a password match; and blocking a display of channels other than the user channel if the comparing determines there is no password match, or enabling only the display of the user channel if the comparing determines there is a password match.

Thereafter, to simulate the televising of registered broadcast programs (user channel programming) on the designated and enabled user channel, the system controller 104 determines whether a reserved play broadcast program (i.e., a user-channel-registered broadcast program) has been set to be output using an enabled display with reference to a current timing point (S403). If not, the system controller 104 waits for a corresponding timing point, i.e., a registered time slot; therefore, for certain periods of time, there may be no available (enabled) display via the designated user channel. When the current time corresponds to the set time slot of a registered broadcast program, the system controller 104 determines whether it is possible to enable display of the corresponding broadcast program, that is, whether the program is playable from the current timing point; if not, a corresponding error message may be displayed.

In more detail, with reference to the received EPG information, the system controller 104 compares a start time $T_R$ of each of the user-channel-registered broadcast programs to that of the corresponding original broadcast program, namely, a start time $T_{EPG}$ (S404, S405). If the compared start times coincide, which may occur according to a specific setting operation performed with respect to the process of FIG. 3, as in the case of the program PRG8 of user channel CH1 whose start time coincides with that of its corresponding original broadcast by the broadcast channel CH2, the system controller 104 controls the system to enable display of the registered broadcast program without any recording by the PVR (S406, S407). Meanwhile, if the compared start times show that a start time $T_R$ is not earlier than a start time $T_{EPG}$, indicating that the program is playable from the current timing point, the system controller 104 controls the system to enable display the registered broadcast program after being recorded by the PVR (S408, S409). If the compared start times show that a start time $T_R$ is earlier than a start time $T_{EPG}$, indicating that the program cannot be played from the current timing point, the system controller 104 controls the OSD generator 106 to generate OSD data for displaying an error message on the display module 110 (S410). The checking operation performed by the step S403 continues to be executed, and an enabled display of the registered broadcast programs continues per the preset "televising" sequence for the corresponding time slots according to the steps S404~S409, provided that the user channel designation is maintained (S411).

In some cases, the start time $T_R$ may be set to a timing point later than the corresponding start time $T_{EPG}$ but earlier than the corresponding end time, in which case the PVR may perform a simultaneous recording and playback operation, to enable display of the broadcast program's leading portion to begin before its recording is completed. That is, while recording of the broadcast program's trailing portion continues in the storage medium 107a, an enabled display is initiated based on the portion thus-far recorded in the storage medium, as in the case of the program PRG1 of the user channel CH2, which is scheduled to begin before its corresponding original broadcast by the broadcast channel CH1 is completed.

To enable playback of registered broadcast programs via a user channel, the EPG receiver according to the present invention may simply store the entire received broadcast signal in the storage medium 107a in correspondence with received EPG information, such that every broadcast program is recorded. Then, each registered broadcast program may be reproduced according to its preprogrammed playback time, without concern for whether a corresponding broadcast program is registerable at the time of a user channel editing operation.

With respect to the step S401, besides establishing a user channel in the EPG receiver with reference to received EPG information, a user channel may be established using stored EPG information only. That is, it should be appreciated that the EPG receiver may interface with the user channel using a wireless connection or wireless network. For example, the storage medium 107a of a PVR may be an Internet-based and accessible storage device. Therefore, the EPG receiver of the present invention may include a device having Internet access capabilities, such as a personal computer or cellular phone.

By adopting the present invention, a video device, e.g., a digital television receiver incorporating a personal video recorder, makes use of a reserved recording function and a corresponding pre-programmed playback of the recorded content. By referencing stored EPG information, broadcast programs preferred by a user are set in a user channel to enable the reserved recording and the reserved playback, thereby providing convenience to the user. That is, once an enabled user channel is programmed and designated, there is no need to perform separate operations for file searching and a playback mode selection. In particular, by introducing a function of a user channel, a user is empowered to determine the programming of a dedicated user channel. The user channel can be viewed as desired, in real-time, and an enabled user channel will display only those programs selected and set by the user and will display the programs at the corresponding time slot only. Accordingly, using a password-protected lockout function blocking all other channels, a user can restrict viewing to a preset program list following a preset time line or create a separate user channel whose viewing may be wholly restricted to password holders. The present invention is therefore suited for application to a home environment where close parental supervision of a child's exposure to television content may be desired or where strict parental control of the child's viewing patterns may be desired.

It will be apparent to those skilled in the art that various modifications can be made in the present invention without departing from the spirit or scope of the invention. Thus, it is intended that the present invention covers such modifications provided they come within the scope of the appended claims and their equivalents.

What is claimed is:

1. A method of controlling an apparatus for receiving an electronic program guide (EPG), the method comprising:
    storing, in memory, EPG information arranged according to broadcast channel and broadcast time, the EPG information indicating a plurality of broadcast programs;
    displaying, based on the stored EPG information, an EPG menu including a broadcast program setting area that includes at least one user channel and delineated areas discriminating between broadcast programs that are registerable and non-registerable onto the at least one user channel, wherein the user channel registerable broadcast programs are adaptively delineated according to a time slot of the at least one user channel that is referenced for registering a broadcast program;

identifying a broadcast program, that is delineated to indicate it is a user channel registerable broadcast program, to register the identified broadcast program for preprogrammed playback in the referenced time slot of the at least one user channel; and registering the identified broadcast program in the referenced time slot of the at least one user channel by storing, in memory, program registration information corresponding to the identified broadcast program, wherein the program registration information corresponding to the identified broadcast program is obtained from the displayed EPG menu.

2. The method of claim 1, wherein the identified broadcast program is registered for preprogrammed playback by setting a start time of the identified broadcast program in the broadcast program setting area.

3. The method of claim 2, wherein the start time of the broadcast program of the user channel is not earlier than a broadcast time of the corresponding broadcast program based on the EPG information.

4. The method of claim 2, wherein registration of the identified broadcast program includes assigning the identified broadcast program to a time slot of the user channel.

5. The method of claim 1, wherein the program registration information includes information identifying the corresponding broadcast program and a start time for the preprogrammed playback of the identified broadcast program.

6. The method of claim 1, wherein storing said program registration information includes setting the information identifying the corresponding broadcast program in the broadcast program setting area of the displayed EPG menu.

7. The method of claim 1, further comprising:
enabling a display of the registered broadcast program by setting an output mode of the EPG receiving apparatus.

8. The method of claim 1, wherein the EPG receiving apparatus comprises one selected from the group consisting of a television receiver, a cellular phone, and a personal computer.

9. The method of claim 1, wherein the EPG information comprises channel-specific EPG information received from at least one broadcast channel.

10. The method of claim 1, wherein the EPG information is received from a wireless connection.

11. The method of claim 1, further comprising:
enabling a display of at least one registered broadcast program according to a start time of the at least one registered broadcast program.

12. The method of claim 11, further comprising:
comparing the start time and a broadcast time of the program registration information, to determine whether the at least one registered broadcast program is to be recorded in a storage medium enabling the preprogrammed playback, whether the at least one registered broadcast program is to be displayed without recording in the storage medium, or whether preprogrammed playback of the at least one registered broadcast program is possible from a current time point.

13. The method of claim 11, further comprising:
storing, in memory, a password assigned by a user;
comparing an entered password with the stored password to determine a password match; and
blocking display of channels other than a specific user channel of the at least one user channel, when said comparing determines there is no password match.

14. The method of claim 11, further comprising:
storing, in memory, a password assigned by a user;
comparing an entered password with the stored password to determine a password match; and
enabling display of a specific user channel of the at least one user channel, when said comparing determines there is a password match.

15. The method of claim 1, wherein the delineated areas of the displayed EPG menu enable a visual discrimination between a first display area corresponding to registerable programs and a second display area corresponding to non-registerable programs, by assigning to the first display area a first display characteristic of the EPG menu when the current time is earlier than a broadcast time of the corresponding broadcast program based on the EPG information and by assigning to the second display area a second display characteristic of the EPG menu when the current time is not earlier than a broadcast time of the corresponding broadcast program based on the EPG information.

16. The method of claim 15, wherein the broadcast time of the corresponding broadcast program is based on a scheduled start time according to the stored EPG information.

17. The method of claim 15, wherein the first display area comprises only broadcast programs having a broadcast time later than the current time, and wherein the second display area comprises only broadcast programs having a broadcast time not earlier than the current time.

18. The method of claim 15, wherein each of the first and second display areas delineates between a first group of broadcast programs that includes all registerable programs among broadcast programs currently displayed by the EPG menu and a second group of programs that includes all non-registerable programs among broadcast programs currently displayed by the EPG menu.

19. The method of claim 18, wherein each broadcast program of the first group of broadcast programs has a broadcast time later than the current time and wherein each broadcast program of the second group of broadcast programs has a broadcast time earlier than the current time 20. The method of claim 1, wherein the delineated areas of the displayed EPG menu discriminate between registerable programs and non-registerable programs by assigning a first display characteristic to areas of broadcast programs having a scheduled broadcast start time later than the current time and assigning display characteristic to areas of broadcast programs having a scheduled broadcast start time earlier than the current time.

21. The method of claim 1, wherein only a portion of the identified broadcast program is registered for preprogrammed playback on the user channel.

22. The method of claim 1, wherein identifying the broadcast program of the user channel registerable programs comprises:
selecting a registerable program, as indicated by the delineation, from the displayed broadcast program setting area of the EPG menu, and providing the registerable program into a displayed time slot of the at least one user channel.

23. The method of claim 1, wherein each of the at least one user channels receive separate user selection inputs for selecting registerable broadcast programs to determine separate user channel program schedules.

24. A method of controlling an apparatus for receiving an electronic program guide (EPG), the method comprising:
receiving a broadcast signal including EPG information indicating a plurality of broadcast programs and a broadcast time of each broadcast program;
storing, in memory, the received EPG information;
generating, based on the stored EPG information, an EPG menu displaying the EPG information according to a channel of the received broadcast signal and displaying a broadcast program setting area that includes at least one user channel and delineated areas discriminating between broadcast programs that are registerable and non-registerable onto the at least one user channel, wherein the user channel registerable broadcast programs are adaptively delineated according to a specific time slot of the at least one user channel that is referenced for registering a broadcast program;
registering, with reference to the displayed EPG information, at least one broadcast program delineated to indicate it is a user channel registerable broadcast program by:
selecting a user channel registerable broadcast program for reproducing in the specific time slot of the at least one user channel,
comparing, using the stored EPG information, the specific time slot with the broadcast time of the selected user channel registerable broadcast program, and
determining, based on the comparing, whether the broadcast time of the selected user channel registerable broadcast program is earlier than a start time of the specific time slot; and
recording, according to said determining, the selected user channel registerable broadcast program when the broadcast time of the selected user channel registerable broadcast program is earlier than the start time of the specific time slot.

25. The method of claim 24, further comprising:
reproducing each recorded broadcast program at the corresponding specific time slot.

26. The method of claim 24, further comprising:
storing, in the memory, the received broadcast signal in correspondence to the stored EPG information, thereby recording the at least one broadcast program; and
reproducing a registered broadcast program according to the setting of said registering.

27. The method of claim 24, further comprising:
modifying the setting of a registered broadcast program by performing at least one of resetting the specific time slot, deleting the registered broadcast program from the corresponding user channel, and assigning multiple time slots for the registered broadcast program.

28. The method of claim 24, further comprising:
receiving at least one additional broadcast signal including EPG information indicating at least one broadcast program of the at least one additional broadcast signal and a broadcast time of each broadcast program,
wherein the EPG menu displays the stored EPG information according to each channel of the received broadcast signals and wherein, according to said registering, at least one broadcast program of a first channel and at least one broadcast program of a second channel are registered to one user channel.

29. The method of claim 24, wherein only a portion of the broadcast program is registered to a user channel of the EPG.

30. The method of claim 24, further comprising:
selecting a registerable program, as indicated from the delineation from the displayed broadcast program setting area of the EPG menu, and providing the registerable program into a displayed time slot of the at least one user channel.

31. The method of claim 24, wherein each of the at least one user channels receive separate user selection inputs for selecting registerable broadcast programs to determine separate user channel program schedules.

32. An apparatus for receiving an electronic program guide (EPG), the apparatus comprising:
a receiver module for receiving EPG information indicating a plurality of broadcast programs arranged according to broadcast channel and broadcast time;
a display module for displaying, based on the stored EPG information, an EPG menu including a broadcast program setting area that includes at least one user channel and delineated areas discriminating between broadcast programs that are registerable and non-registerable onto the at least one user channel, wherein the user channel registerable broadcast programs are adaptively delineated according to a time slot of the at least one user channel that is referenced for registering a broadcast program;
a controller for registering at least one broadcast program of the user channel registerable broadcast programs for preprogrammed playback in the referenced time slot of the at least one user channel and for storing in memory program registration information corresponding to the registered broadcast program and information indicative of the at least one user channel, the user channel information including program registration information obtained from the displayed EPG information, the program registration information identifying the registered broadcast program for preprogrammed playback and including a start time of the at least one registered broadcast program and a broadcast time of the broadcast program based on the EPG information, and for enabling a display of the registered broadcast program according to the corresponding referenced time slot of the at least one user channel.

33. The apparatus of claim 32, further comprising:
a personal video recorder for recording and sequentially reproducing the at least one registered broadcast program according to the start time of the at least one registered broadcast program.

34. The apparatus of claim 32, further comprising:
an on-screen display (OSD) generator for generating OSD data for constructing the EPG menu.

35. The apparatus of claim 32, wherein only a portion of the broadcast program is registered for preprogrammed playback on the user channel.

36. The apparatus of claim 32, wherein the registered broadcast program, as indicated from the delineation, is selected from the displayed broadcast program setting area of the EPG menu, and provided into a displayed time slot of the at least one user channel.

37. The apparatus of claim 32, wherein each of the at least one user channels receive separate user selection inputs for selecting registerable broadcast programs to determine separate user channel program schedules.

* * * * *